United States Patent
Lemmers, Jr. et al.

(10) Patent No.: US 8,485,218 B2
(45) Date of Patent: Jul. 16, 2013

(54) OIL PRESSURE REGULATING VALVE FOR GENERATOR APPLICATIONS

(75) Inventors: Glenn C. Lemmers, Jr., Loves Park, IL (US); David S. Behling, Belvidere, IL (US); Mark F. Franzen, Brodhead, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 564 days.

(21) Appl. No.: 12/436,202

(22) Filed: May 6, 2009

(65) Prior Publication Data

US 2010/0283333 A1 Nov. 11, 2010

(51) Int. Cl.
*F16K 25/00* (2006.01)
*F16K 51/00* (2006.01)

(52) U.S. Cl.
USPC .................. 137/454.6; 137/625.37; 251/63.5

(58) Field of Classification Search
USPC ............... 137/625.34, 625.36, 625.37, 454.6; 251/63.5, 62; 310/53, 54
See application file for complete search history.

(56) References Cited

U.S. PATENT DOCUMENTS

| | | | |
|---|---|---|---|
| 3,146,720 A | | 9/1964 | Henry |
| 3,532,122 A | * | 10/1970 | Bienzeisler ............... 137/625.37 |
| 4,368,872 A | * | 1/1983 | Machat ............................ 251/63 |
| 5,013,220 A | | 5/1991 | Nakagawa et al. |
| 5,220,793 A | | 6/1993 | McGlone et al. |
| 5,961,307 A | | 10/1999 | Key et al. |
| 6,062,681 A | | 5/2000 | Field et al. |
| 6,353,790 B1 | | 3/2002 | Tsuzuki |
| 7,165,949 B2 | | 1/2007 | Firnhaber |
| 7,216,473 B1 | | 5/2007 | McArthur et al. |
| 7,216,487 B2 | | 5/2007 | Parsons |
| 7,251,925 B2 | | 8/2007 | Paradise |
| 7,363,937 B2 | * | 4/2008 | Suter et al. ..................... 137/375 |

* cited by examiner

*Primary Examiner* — John Fox
*Assistant Examiner* — Seth Faulb
(74) *Attorney, Agent, or Firm* — Carlson, Gaskey & Olds, PC

(57) ABSTRACT

A generator includes a rotor to be driven to rotate and generate electricity and a housing receiving the rotor. An oil supply includes an oil inlet port and an oil outlet port. A pressure regulating valve regulates the flow of oil from the inlet port to the outlet port. The pressure regulating valve includes a valve sleeve mounted within the housing. The valve sleeve extends into a bore within the housing. A valve spool is mounted within the valve sleeve. The valve sleeve has a flange abutting an outer face of the housing. Bolts tighten the flange against the housing. An inner end of the valve sleeve extends radially inwardly to form a ledge. The ledge is spaced away from an inner face of the housing. A valve sleeve, a sense piston and a valve spool are also disclosed and claimed.

6 Claims, 4 Drawing Sheets

OIL PRESSURE REGULATING VALVE FOR GENERATOR APPLICATIONS

BACKGROUND OF THE INVENTION

This application relates to an oil regulating valve for use in an electrical generator.

Generators are known, and typically include a rotor which is driven to rotate by a source of rotation, such as a gas turbine engine on an aircraft. The rotor carries electric windings, which rotate in proximity to stator windings. The relative rotation of the rotor adjacent to the stator generates electricity.

Generators are also provided with many auxiliary systems and components. Oil is required to be delivered to several locations within the generator to ensure continued efficient operation of the systems and components.

It is known to provide a pressure regulating valve on an oil flow line to control the volume of oil being delivered to downstream uses dependent on the pressure of the oil. The existing pressure regulating valves in generators have some challenges. In one challenge, debris may sometimes be entrained in the oil and block the ports associated with the pressure regulating valve. It would be desirable that a sliding valve spool be able to shear this debris. However, the forces on the valve in the present pressure regulating valves have not always been sufficient to shear the debris.

In addition, a housing sleeve for the valve is mounted within a housing. When the pressure regulating valve is torqued by screws to be secured within the housing, the sleeve has sometimes been crushed against an opposed housing wall. This is undesirable.

SUMMARY OF THE INVENTION

A generator includes a rotor to be driven to rotate and generate electricity and a housing receiving the rotor. An oil supply includes an oil inlet port and an oil outlet port. A pressure regulating valve regulates the flow of oil from the inlet port to the outlet port. The pressure regulating valve includes a valve sleeve mounted within the housing. The valve sleeve extends into a bore within the housing. A valve spool is mounted within the valve sleeve. The valve sleeve has a flange abutting an outer face of the housing. Bolts tighten the flange against the housing. An inner end of the valve sleeve extends radially inwardly to form a ledge. The ledge is spaced away from an inner face of the housing.

A valve sleeve for use in a pressure regulating valve of a generator includes a valve sleeve having a length, and a flange at one end. A portion of the valve sleeve extends inwardly from the flange to form a ledge extending radially inwardly and to a sense piston bore extending axially further inwardly from the ledge. An inner diameter at the sense piston bore is smaller than an inner diameter at a portion of the valve sleeve for receiving a valve spool.

A sense piston for use in a pressure regulator valve for a generator includes a sense piston for use with a pressure regulating valve having a valve spool with an outer diameter. The sense piston has an outer diameter. A ratio of the outer diameter of the valve spool that is to be utilized with the sense piston to the outer diameter of the sense piston is between 1.5 and 1.7.

A valve spool for use in a pressure regulating valve of a generator includes a valve spool having a pair of opposed lands with an outer diameter, and a central passage through the valve spool leading to an orifice in one of the lands. The orifice has a smallest inner diameter, and a ratio of the outer diameter of the lands to the smallest inner diameter of the orifice is between 39 and 44.

These and other features of the present invention can be best understood from the following specification and drawings, the following of which is a brief description.

DETAILED DESCRIPTION OF THE PREFERRED EMBODIMENT

Figure 1:
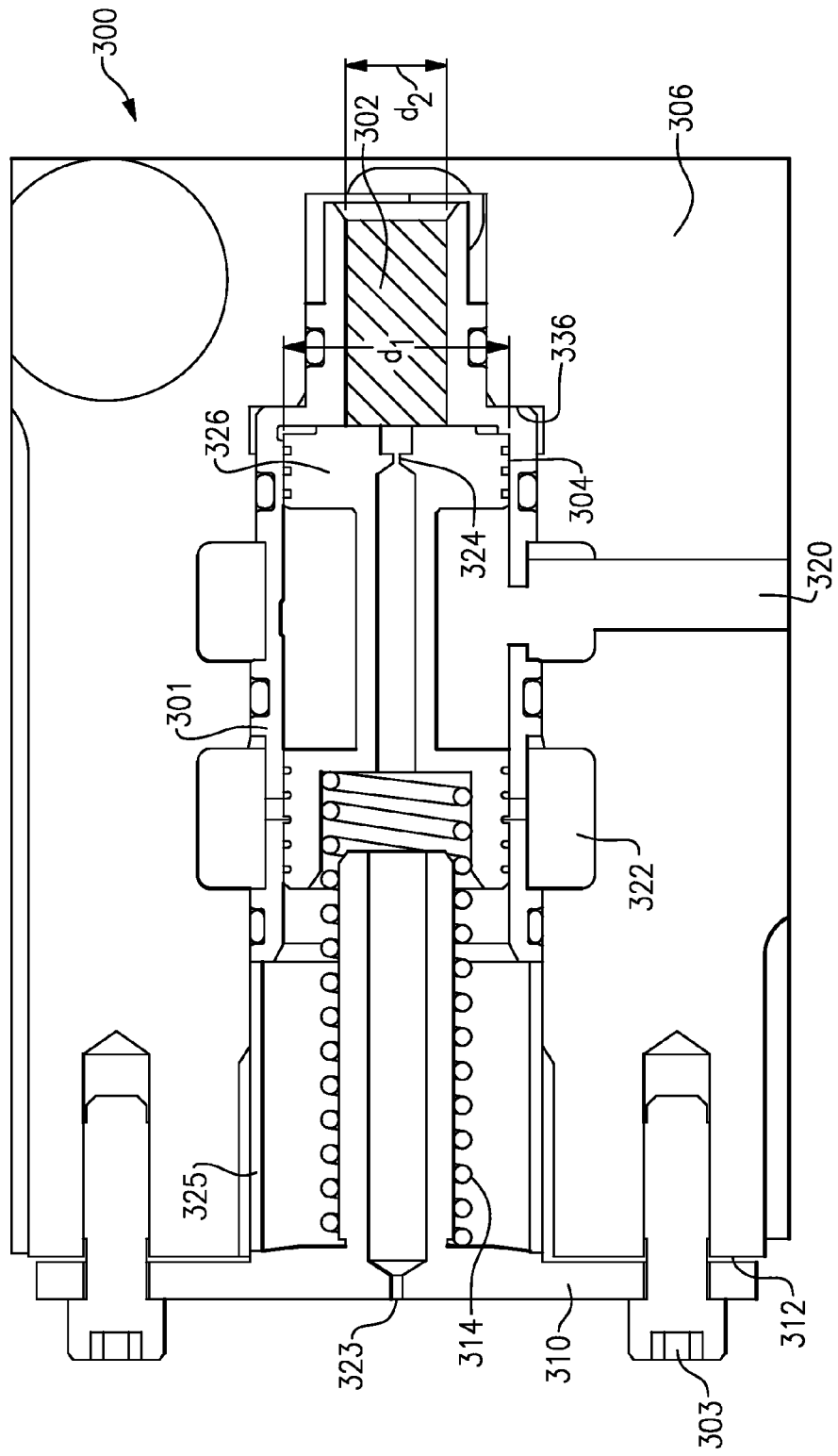
FIG. 1 shows a prior art valve.

A prior art valve 300 is illustrated in FIG. 1. In the prior art valve 300, an outer housing 306 receives a valve spool 326. A sense piston 302 is positioned at one side of the valve spool 326, and a spring 314 biases the valve spool 326 toward the sense piston 302. A valve cover 310 is clamped against an outer face 312 of an outer edge of clamp collar 325. The clamp collar 325 is forced to the right as shown in this figure by the cover 310, and against a sleeve 301. The sleeve 301 is forced against an end face 336 of the housing 306, and can be subject to distortion by this contact when bolts 303 are tightened. The valve is carefully designed and engineered, and this distortion can effect the overall efficient operation of the valve system.

The valve spool 326 moves to the left and right and regulates flow between an inlet port 320 and an outlet port 322. Outlet port 322 leads to various uses for oil in a generator. Bleed orifice 323 is formed at an end of the valve cover 310, and orifice 324 in the valve spool 326. The outer diameter of the lands 304 on the valve spool 326 and the inner diameter of the housing 306 are selected such that there is radial clearance. This clearance allows oil to flow into chambers on each side of the lands on valve spool 326. A spring 314 biases the valve spool 326 to the right as shown in this Figure. The sense piston 302 can move to the right and left also under influence of pressure. The sense piston 302 is of a relatively small outer diameter in this Figure, and this limits the strength of the spring 314. Since the strength of the spring 314 is somewhat limited, the ability of the valve spool to cut debris captured in the ports leading to the inlet 320 or the outlet 322 is not as high as is desirable. In a known pressure regulating valve, an outer diameter d1 of the valve spool was 0.7022" (17.83 mm). The outer diameter d2 of the sense piston 302 was 0.31496" (7.9999 mm). The orifice has a smallest diameter bore, or restriction, of 0.020" (5.08 mm).

Figure 2:
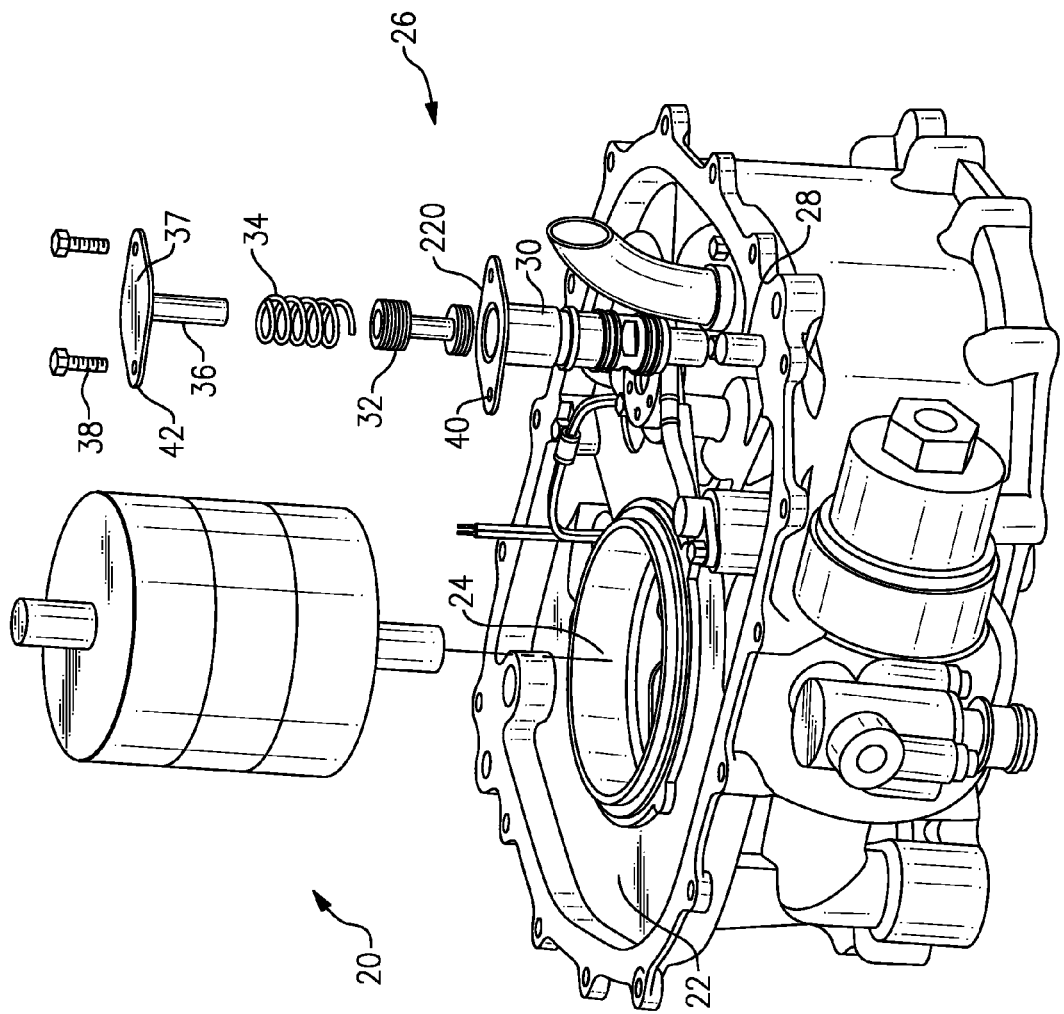
FIG. 2 is an assembly of a generator incorporating the inventive valve.

FIG. 2 shows the location of an inventive pressure regulating valve 26 in a generator housing 22. As known, and as shown schematically, the generator housing 22 will receive a generator rotor assembly 20. The generator rotor assembly 20 is received within a bore 24 in the housing 22. The pressure regulator valve 26 includes sleeve 30 having bolt holes 40, a sense piston 28, a valve spool 32, a coil spring 34, and a cover 36. The cover has an outer end 37 receiving bolts 38 through holes 42.

Figure 3:
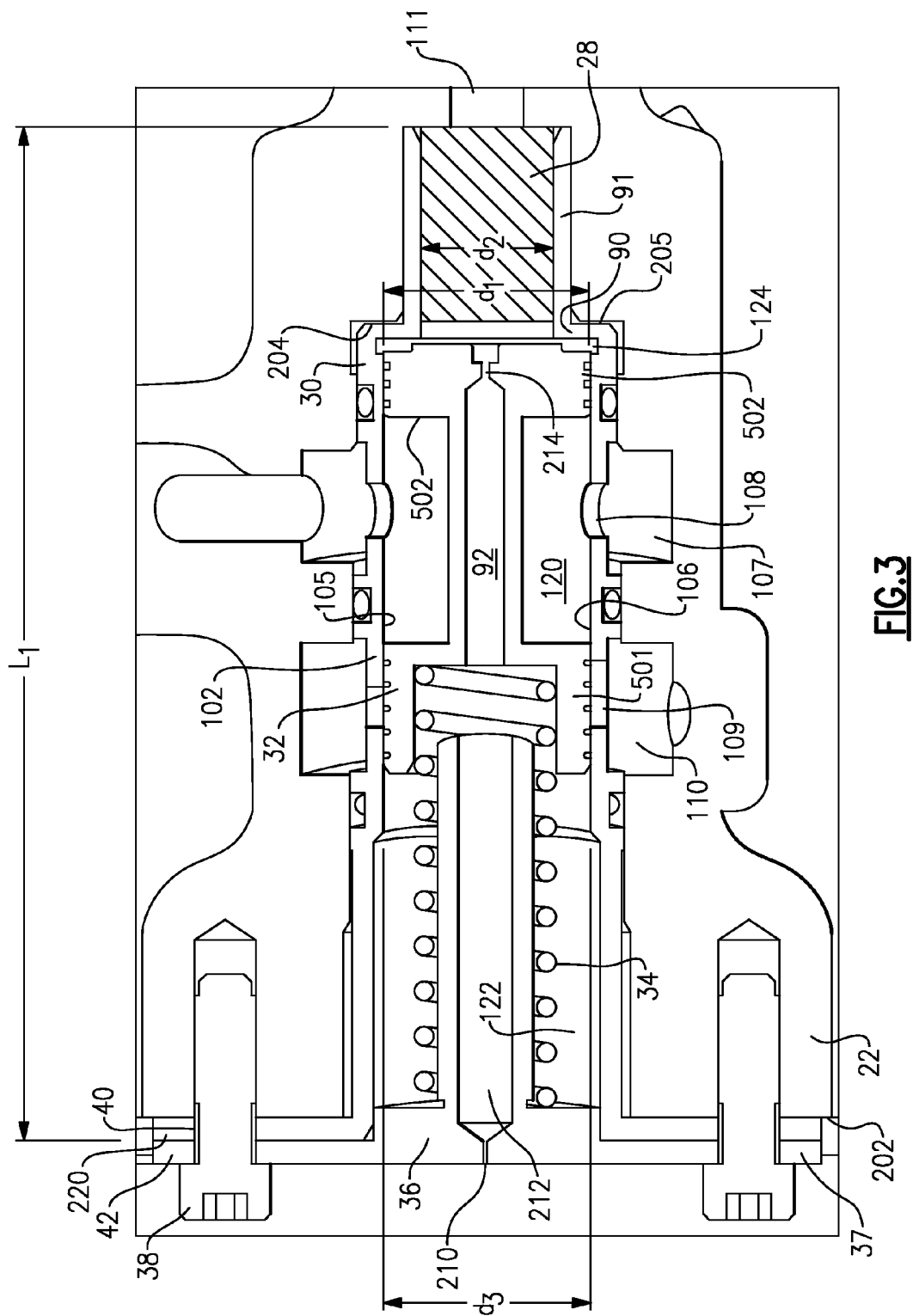
FIG. 3 is a cross-sectional valve through the inventive valve.

As can be seen in FIG. 3, the outer portion 37 of the cover 36 abuts an outer portion 220 of the sleeve 30. These portions are bolted by bolts 38 against an end 202 of a main housing 22. However, an inner end 205 of the sleeve 30 is sized to be spaced from an inner end face 204 of the main housing 22. Thus, the distortion mentioned above will not occur due to the flange or outer portion 220 of the sleeve. Sleeve 30 will not be crushed, as its movement to the right, as shown in FIG. 3 will be limited.

As shown in FIG. 3, the sleeve 30 extends to a radially inwardly extending ledge 90. The ledge 90 connects into an inwardly extending bore 91, which receives sense piston 28. Bore 91 has a smaller diameter than a portion 105 of the sleeve that is to receive the valve spool. As can be appreciated, the valve spool has lands 501 and 502 which are received in the portion 105 of the valve sleeve 30. An overall length L1 of the valve sleeve 30 is 3.328 (84.53 mm). A diameter d3 of the portion 105 is 0.7028" (17.85 mm). A ratio of L1 to d3 is between 4.70 and 4.76.

As known, relatively high pressure oil enters an oil chamber 107 enters ports 108 and passes into a chamber 120. This oil can move through other ports 109 into an outlet chamber 110. As in the prior art, a coil spring 34 biases a valve spool 32 to the right and towards a sense piston 28. Central passage 92 in sleeve 30 communicates with orifice 214 and passage 212. Cover 36 communicates with orifice 210. The bleed orifices 210 and 214 are formed as in the prior art. However, these bleed orifices can be smaller than was the case in the prior art. In addition, the force of spring 34 can be higher, since the sense piston 28 has a greater diameter d2, here 0.4377" (11.11 mm) than was the case in the prior art. The diameter d1 of the land 502 on the valve spool may be as the same in the prior art, and may be 0.7022" (17.83 mm). In embodiments of this invention, a ratio of d1 to d2 is between 1.5 to 1.7.

Relatively high pressure is also delivered into a right hand side port 111, and biases the feedback sense piston 28 toward the left as shown in this Figure. However, this movement is dampened by the fluid in the chamber 124, which also dampens movement of the valve spool 32. Chamber 122 also dampens movement of the spool.

With the inventive pressure regulating valve, the distortion to the valve sleeve is reduced compared to the prior art. In addition, the forces moving the valve spool are much higher than in the prior art, and yet are still accommodated due to the higher ratio of the outer diameter of the feedback sense piston 28 relative to the outer diameter of the valve spool 32.

Figure 4:
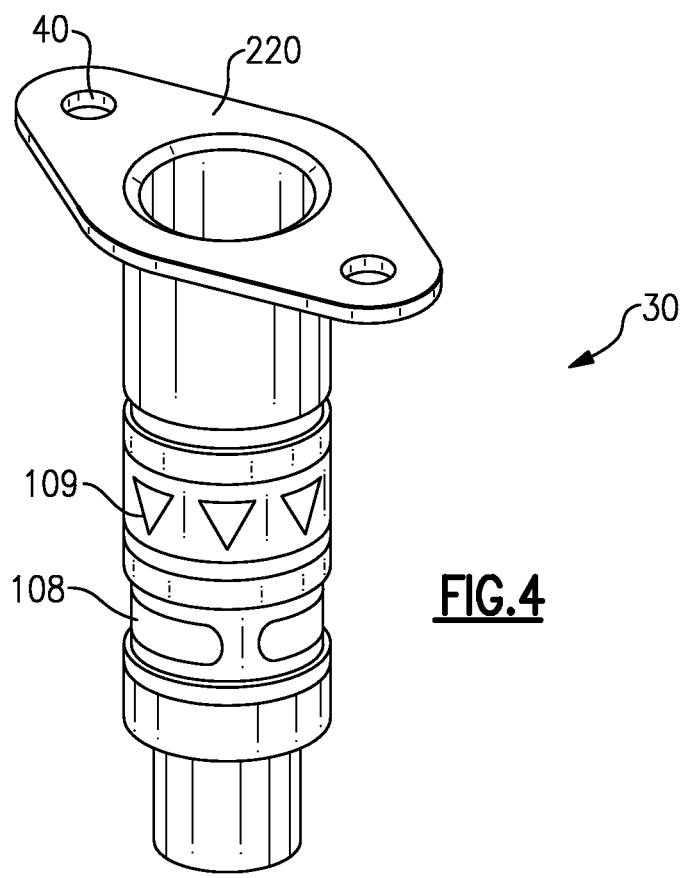
FIG. 4 shows a valve sleeve according to this invention.

The valve sleeve 30 is illustrated in FIG. 4, having flange 220. The ports 108 and 109 are shown to be of differing shapes.

Figure 5:
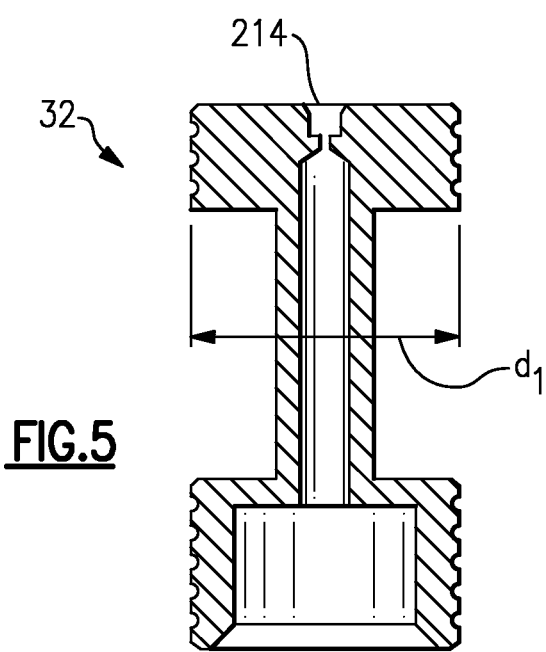
FIG. 5 shows a valve spool.

FIG. 5 shows the valve spool 32, and a smallest inner diameter or restriction at the orifice 214. The orifice 214 has an inner diameter 0.017" (0.431 mm). A ratio of the inner diameter of this orifice relative to the outer diameter d1 is within 39 to 44.

As can be appreciated, the components shown in FIG. 3 are all centered about a central axis of the valve spool 32, and along which axis the valve spool moves. Thus, it can be appreciated that the ledge 90 extends radially inwardly relative to this axis, and then axially inwardly to the inwardly extending bore 91.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A generator comprising:
   a rotor to be driven to rotate and generate electricity;
   a housing receiving said rotor;
   an oil supply including an oil inlet port and an oil outlet port;
   a pressure regulating valve to regulate the flow of oil from the inlet port to the outlet port, said pressure regulating valve including a valve sleeve mounted within said housing, said valve sleeve extending into a bore within said housing, and a valve spool mounted within said valve sleeve, said valve sleeve having a flange outward of an outer face of said housing, an inner end of said valve sleeve extending radially inwardly to form a ledge, and said ledge being spaced away from an inner face of said housing;
   said valve sleeve having an extending small bore extending from a radially inner end of said ledge, and received in a sense piston bore in said housing, and a sense piston received in said small bore, with said ledge being attached to said housing by bolts, with said flange limiting said valve sleeve from contacting said inner face of said housing as said bolts are tightened; and
   wherein the valve sleeve has an overall length, and an inner bore portion of said valve sleeve receiving said valve spool has an inner diameter, and a ratio of said overall length to said inner diameter being between 4.70 and 4.76.

2. The generator as set forth in claim 1, wherein a valve cover has a flange received outwardly of said flange on said valve sleeve, and said bolts secure both said valve cover and said valve sleeve to said housing.

3. The generator as set forth in claim 1, wherein a ratio of a greatest outer diameter of the valve spool to an outer diameter of said sense piston is between 1.5 and 1.7.

4. The generator as set forth in claim 1, wherein said valve spool having a pair of opposed lands with an outer diameter, and a central passage through said valve spool leading to an orifice in one of said lands, said orifice having a smallest inner diameter, and a ratio of said outer diameter of said land to said smallest inner diameter of said orifice being between 39 and 44.

5. A valve sleeve for use in a pressure regulating valve of a generator comprising:
   a valve sleeve centered on an axis and having a length, and a flange at one end, a portion of said valve sleeve extending axially from said flange to a ledge extending radially inwardly, then extending axially further from said ledge, an inner diameter at said further axial extension being smaller than an inner diameter at a portion of said valve sleeve for receiving a valve spool; and
   a length being defined from an end of said flange to an end of said further axial extension of said valve sleeve, and an inner diameter being defined at said portion for receiving the valve spool, a ratio of said length to said inner diameter being between 4.70 and 4.76.

6. A generator comprising:
   a rotor to be driven to rotate and generate electricity;
   a housing receiving said rotor;
   an oil supply including an oil inlet port and an oil outlet port;
   a pressure regulating valve to regulate the flow of oil from the inlet port to the outlet port, said pressure regulating valve including a valve sleeve mounted within said housing, said valve sleeve extending into a bore within said housing, and a valve spool mounted within said valve sleeve, said valve sleeve having a flange outward of an outer face of said housing, an inner end of said valve sleeve extending radially inwardly to form a ledge, and said ledge being spaced away from an inner face of said housing;

said valve sleeve having an extending small bore extending from a radially inner end of said ledge, and received in a sense piston bore in said housing, and a sense piston received in said small bore, with said ledge being attached to said housing by bolts, with said flange limiting said valve sleeve from contacting said inner face of said housing as said bolts are tightened; and wherein the valve sleeve has an overall length, and an inner bore portion of said valve sleeve receiving said valve spool has an inner diameter, and a ratio of said overall length to said inner diameter being between 4.70 and 4.76, a ratio of a greatest outer diameter of the valve spool to an outer diameter of said sense piston is between 1.5 and 1.7, and said valve spool having a pair of opposed lands with an outer diameter, and a central passage through said valve spool leading to an orifice in one of said lands, said orifice having a smallest inner diameter, and a ratio of said outer diameter of said land to said smallest inner diameter of said orifice being between 39 and 44.

* * * * *